United States Patent
Judkins et al.

[11] Patent Number: 6,114,058
[45] Date of Patent: Sep. 5, 2000

[54] IRON ALUMINIDE ALLOY CONTAINER FOR SOLID OXIDE FUEL CELLS

[75] Inventors: Roddie Reagan Judkins, Knoxville, Tenn.; Prabhakar Singh, Export, Pa.; Vinod Kumar Sikka, Oak Ridge, Tenn.

[73] Assignee: Siemens Westinghouse Power Corporation, Orlando, Fla.

[21] Appl. No.: 09/084,145

[22] Filed: May 26, 1998

[51] Int. Cl.[7] ............................. H01M 8/00; H01M 2/00; H01M 4/00

[52] U.S. Cl. ............................. 429/13; 429/34; 429/176; 428/34.1

[58] Field of Search ................. 429/13, 12, 30, 429/31, 34, 176; 428/34.1

[56] References Cited

U.S. PATENT DOCUMENTS

| | | | |
|---|---|---|---|
| 3,026,197 | 3/1962 | Schramm | 75/124 |
| 4,395,468 | 7/1983 | Isenberg | 429/31 |
| 4,431,715 | 2/1984 | Isenberg | 429/30 |
| 4,490,444 | 12/1984 | Isenberg | 429/31 |
| 4,562,124 | 12/1985 | Ruka | 429/30 |
| 4,612,165 | 9/1986 | Liu et al. | 420/459 |
| 4,631,238 | 12/1986 | Ruka | 429/30 |
| 4,647,427 | 3/1987 | Liu | 420/435 |
| 4,711,761 | 12/1987 | Liu et al. | 420/459 |
| 4,722,828 | 2/1988 | Liu | 420/455 |
| 4,728,584 | 3/1988 | Isenberg | 420/455 |
| 4,731,221 | 3/1988 | Liu | 420/455 |
| 4,748,091 | 5/1988 | Isenberg | 429/31 |
| 4,751,152 | 6/1988 | Zymboly | 429/31 |
| 4,791,035 | 12/1988 | Reichner | 429/31 |
| 4,801,369 | 1/1989 | Draper et al. | 204/258 |
| 4,833,045 | 5/1989 | Pollack et al. | 429/30 |
| 4,847,044 | 7/1989 | Ghosh | 419/8 |
| 4,865,666 | 9/1989 | Kumar et al. | 148/437 |
| 4,874,678 | 10/1989 | Reichner | 429/30 |
| 4,876,163 | 10/1989 | Reichner | 429/30 |
| 4,961,903 | 10/1990 | McKamey et al. | 420/79 |
| 5,006,308 | 4/1991 | Liu et al. | 420/445 |
| 5,108,850 | 4/1992 | Carlson et al. | 429/31 |
| 5,160,557 | 11/1992 | Chang | 148/546 |
| 5,238,645 | 8/1993 | Sikka et al. | 420/79 |
| 5,258,240 | 11/1993 | Di Croce et al. | 429/31 |
| 5,273,838 | 12/1993 | Draper et al. | 429/32 |
| 5,320,802 | 6/1994 | Liu et al. | 420/81 |
| 5,346,562 | 9/1994 | Batawi et al. | 148/542 |
| 5,350,107 | 9/1994 | Wright et al. | 228/198 |
| 5,411,702 | 5/1995 | Nazmy et al. | 420/79 |
| 5,525,779 | 6/1996 | Santella et al. | 219/137 WM |
| 5,545,373 | 8/1996 | Maziasz et al. | 420/81 |
| 5,573,867 | 11/1996 | Zafred et al. | 429/17 |
| 5,620,651 | 4/1997 | Sikka et al. | 420/81 |
| 5,637,816 | 6/1997 | Schneibel | 75/240 |
| 5,919,584 | 7/1999 | Akagi | 429/34 |

*Primary Examiner*—Kathryn Gorgos
*Assistant Examiner*—Erica Smith-Hicks
*Attorney, Agent, or Firm*—Eckert Seamans Cherin & Mellott, LLC

[57] ABSTRACT

A container for fuel cells is made from an iron aluminide alloy. The container alloy preferably includes from about 13 to about 22 weight percent Al, from about 2 to about 8 weight percent Cr, from about 0.1 to about 4 weight percent M selected from Zr and Hf, from about 0.005 to about 0.5 weight percent B or from about 0.001 to about 1 weight percent C, and the balance Fe and incidental impurities. The iron aluminide container alloy is extremely resistant to corrosion and metal loss when exposed to dual reducing and oxidizing atmospheres at elevated temperatures. The alloy is particularly useful for containment vessels for solid oxide fuel cells, as a replacement for stainless steel alloys which are currently used.

30 Claims, 2 Drawing Sheets

IRON ALUMINIDE ALLOY CONTAINER FOR SOLID OXIDE FUEL CELLS

GOVERNMENT RIGHTS

The United States government has certain rights in this invention pursuant to Contract Nos. DE-FC21-91MC28055 and DE-AC05-96OR22464 awarded by the United States Department of Energy.

FIELD OF THE INVENTION

The present invention relates to containers for fuel cells, and more particularly relates to solid oxide fuel cell containers made of iron aluminide alloys.

BACKGROUND INFORMATION

Fuel cells are among the most efficient of power generation devices. One type of solid oxide fuel cell (SOFC) has a projected 70 percent net efficiency when used in an integrated SOFC-combustion turbine power system in which the turbine combustor is replaced by a SOFC. Conventional SOFCs operate with various hydrocarbon fuel sources. For example, the SOFCs may operate directly on natural gas at about 1000° C., without the need for external reforming of the natural gas, i.e., the high operating temperature results in internal reforming of the natural gas to $H_2$ and CO.

An individual fuel cell element of a conventional SOFC design consists of a closed end porous strontium-doped lanthanum manganite tube, which serves as the support structure for the individual cell and is also the cathode or air electrode of the cell. A thin, gas-tight yttria-stabilized zirconia electrolyte covers the air electrode except for a relatively thin strip of an interconnection surface, which is a dense gas-tight layer of magnesium-doped lanthanum chromite. This strip serves as the electric contacting area to an adjacent cell or, alternatively, to a power contact. A porous nickel-zirconia cermet layer, which is the anode, or fuel electrode, covers the electrolyte, but not the interconnection strip. Exemplary fuel cells are disclosed in U.S. Pat. No. 4,431,715 to Isenberg, U.S. Pat. No. 4,490,444 to Isenberg, U.S. Pat. No. 4,562,124 to Ruka, U.S. Pat. No. 4,631,238 to Ruka, U.S. Pat. No. 4,748,091 to Isenberg, U.S. Pat. No. 4,791,035 to Reichner, U.S. Pat. No. 4,833,045 to Pollack et al., U.S. Pat. No. 4,874,678 to Reichner, U.S. Pat. No. 4,876,163 to Reichner, U.S. Pat. No. 5,108,850 to Carlson et al., U.S. Pat. No. 5,258,240 to Di Croce et al., and U.S. Pat. No. 5,273,828 to Draper et al., each of which is incorporated herein by reference.

Conventional SOFC electric generators consist of a containment vessel in which are housed an array of series-parallel electrically connected cells to form submodules, which in turn are further combined in series or parallel connections to form the generator module. Depending on the electrical capacity of the generator module, the number of cells may vary from a few hundred to several thousand individual cells. These modules are equipped with ancillary equipment such as air delivery tubes to each cell and are housed in a metal container equipped with fuel and air delivery systems as well as an exhaust port for unused fuel and excess air.

The SOFC generator container is simultaneously exposed to oxidizing and reducing gas atmospheres. In operation, the wall temperature is about 650° C., although excursions of perhaps 100–150° C. could occur during the operation. This dual gas atmosphere presents a greater corrosion challenge to the container than does exposure to either flowing air, the environment outside the container, or fuel ($CH_4$, CO, $H_2$, $CO_2$, $H_2O$), the environment inside the container. The most widely used SOFC container material is stainless steel AISI 304. Corrosion that occurs to such fuel cell containers can significantly limit the performance and lifetime of a fuel cell system.

The present invention has been developed in view of the foregoing, and to address other deficiencies of the prior art.

SUMMARY OF THE INVENTION

The present invention provides a SOFC containment vessel comprising an iron aluminide alloy. The iron aluminide alloy possesses significantly improved corrosion resistance at elevated temperatures in both oxidizing and reducing environments present simultaneously during operation of fuel cells.

The present invention provides a containment structure for SOFCs which enables longer service life compared with conventional containment materials. The SOFC container comprises an iron aluminide alloy which houses an assemblage of solid oxide fuel cells, and which also contains gases during operation of the fuel cell.

An object of the present invention is to provide a container for a fuel cell comprising an iron aluminide alloy including Fe, from about 13 to about 22 weight percent Al, from about 2 to about 8 weight percent Cr, from about 0.1 to about 4 weight percent of a boride-forming or carbide forming reactive metal such as Zr or Hf, up to about 0.5 weight percent B, and up to about 1 weight percent C.

Another object of the present invention is to provide a method of fabricating a fuel cell container. The method includes the steps of providing iron aluminide alloy component parts of the fuel cell container, and joining the iron aluminide alloy component parts together.

Another object of the present invention is to provide a method of operating a fuel cell generator. The method includes the steps of providing a container comprising an iron aluminide alloy, providing a plurality of fuel cells inside the container, providing a reducing atmosphere inside the container in contact with the iron aluminide alloy, and providing an oxidizing atmosphere outside the container in contact with the iron aluminide alloy.

These and other objects of the present invention will be more apparent from the following description.

DESCRIPTION OF THE PREFERRED EMBODIMENT

In accordance with the present invention, a solid oxide fuel cell (SOFC) container is provided. The SOFC is an electricity-generating device that operates at high temperatures and employs natural gas or other hydrocarbons as a fuel. The natural gas or other fuel is preferably reformed in-situ, and the resultant $H_2$ and CO are involved in electrochemical cell reactions with oxygen ions produced from an air stream. The SOFC produces electrical power as well as high temperature exhaust gas. The SOFC is typically a ceramic system made of a plurality of individual fuel cells arrayed into an assembly to create an electrical generator. In one type of SOFC, the fuel gas circulates on the outside of the array of fuel cells. The fuel gas must be maintained at the appropriate stoichiometry, temperature and pressure conditions to permit the fuel cell system to operate properly. The container for the assemblage of fuel cells is a metallic structure which also assures containment of the fuel gas.

Figure 1:
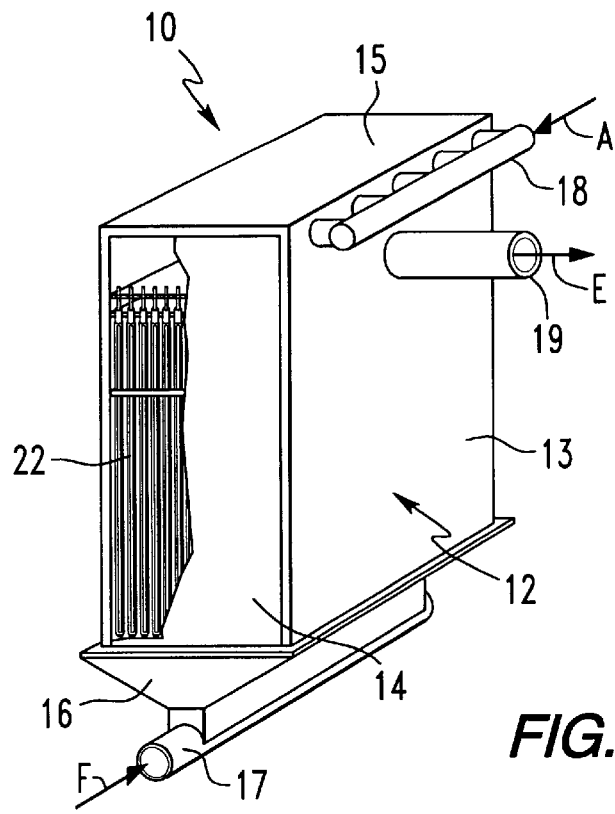
FIG. 1 is a perspective view of a solid oxide fuel cell container in accordance with an embodiment of the present invention.

FIG. 1 illustrates a solid oxide fuel cell generator 10 including a container 12. The container 12 includes sidewalls 13 and 14, a top 15, and a bottom 16. Fuel F is delivered to the generator 10 by a fuel inlet tube 17. Air A is delivered to the generator 10 by an air inlet manifold 18. Exhaust gas E is removed from the generator 10 by an exhaust outlet tube 19. An array of fuel cells 22 is mounted inside the container 12.

Figure 2:
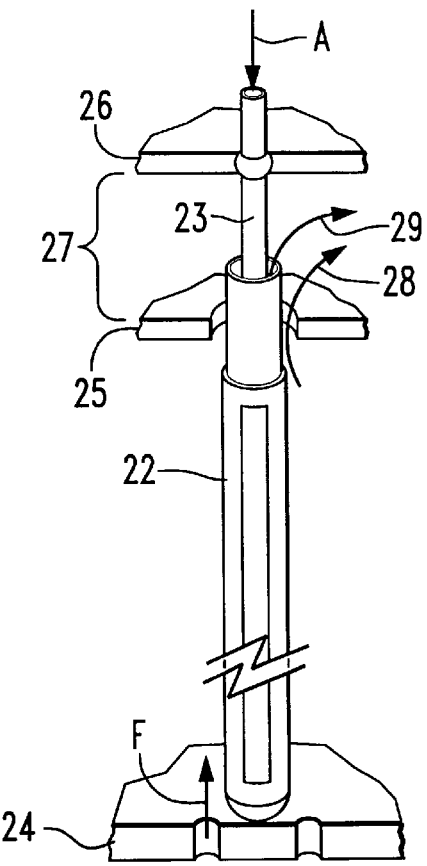
FIG. 2 is an elevational view of a solid oxide fuel cell which may be housed inside a container in accordance with an embodiment of the present invention.

As shown in FIG. 2, each fuel cell 22 has a tubular shape with an open upper end and a closed bottom end. Fuel F supplied through the fuel inlet tube 17 flows through a perforated plate 24 and contacts the outside surface or fuel electrode of each fuel cell 22. Air A supplied through the inlet manifold 18 flows into each fuel cell 22 via an air insertion tube 23. The air insertion tubes 23 are supported by an upper plate 26. The upper end of each fuel cell 22 extends through a lower plate 25. The lower and upper plates 25 and 26 form a combustion zone 27. Depleted fuel 28 flowing through the lower plate 25 and depleted air 29 flowing from the interior of the fuel cell 22 combine in the combustion zone 27 where they are combusted. The combustion products form the exhaust gas E, which is removed from the generator 10 by the exhaust tube 19.

During operation of the SOFC generator 10, the container material 12 is simultaneously exposed to an oxidizing gas atmosphere on its exterior and a reducing gas atmosphere on its interior, i.e., a dual gas atmosphere. This dual gas atmosphere presents a formidable environmental compatibility challenge to the container material. In operation, the fuel cell temperature is typically from about 500 to about 800° C., usually about 1,000° C., and the container temperature is typically about 650° C.

In accordance with the present invention, the iron aluminide SOFC container alloy preferably comprises from about 13 to about 22 weight percent Al, from about 2 to about 8 weight percent Cr, from about 0.1 to about 4 weight percent M wherein M is a boride-forming or carbide-forming reactive metal selected from Zr and Hf, from about 0.005 to about 0.5 weight percent B and/or from about 0.001 to about 1 weight percent C, and the balance Fe and incidental impurities. More preferably, the iron aluminide alloy comprises from about 15 to about 18 weight percent Al, from about 4 to about 6 weight percent Cr, from about 0.1 to about 1.5 weight percent Zr, and from about 0.005 to about 0.02 weight percent B or from about 0.002 to about 0.02 C. Most preferably, the iron aluminide alloy comprises from about 15 to about 17 weight percent Al, from about 4.5 to about 5.5 weight percent Cr, from about 0.15 to about 1 weight percent Zr, and from about 0.007 to about 0.012 weight percent B or from about 0.005 to about 0.012 C. A particularly preferred alloy comprises Fe-15.9Al-5.5Cr-0.15Zr-0.01B, in weight percent. Another particularly preferred alloy comprises Fe-15.9Al-5.5Cr-1.0Zr-0.01C, in weight percent. The present alloys may comprise boron, carbon, or a combination thereof. The addition of C may be preferred for certain applications because the presence of carbon may improve the weldability of the alloys. The preferred, more preferred and most preferred compositional ranges of Fe—Al—Cr—Zr—B and Fe—Al—Cr—Zr—C alloys in accordance with embodiments of the present invention are shown in Table 1.

TABLE 1

| | Compositional Ranges (Weight Percent) | | | | | |
|---|---|---|---|---|---|---|
| | Al | Cr | Zr | B | C | Fe |
| Preferred | 13–22 | 2–8 | 0.1–4 | 0.005–1 | 0.001–1 | balance |
| More Preferred | 15–18 | 4–6 | 0.1–1.5 | 0.005–0.02 | 0.002–0.02 | balance |
| Most Preferred | 15–17 | 4.5–5.5 | 0.15–1 | 0.007–0.012 | 0.005–0.012 | balance |

By controlling the amounts of Fe and Al in the present alloys, a specific intermetallic compound is preferably formed. The iron aluminide alloys may have Al levels in the range of from about 13 to about 22 weight percent. In this range of Al, the Fe and Al primarily form the compound $Fe_3Al$. The $Fe_3Al$ intermetallic phase has an ordered $DO_3$ crystal structure up to a temperature of 540° C. Above 540° C., the $DO_3$ structure changes to a lesser ordered structure known as B2. At still higher temperature, e.g., greater than 900° C., the B2 structure becomes a completely disordered structure known as α phase. Above about 1450° C., the alloy melts. The crystal structure of the present alloys may be equiaxed and single phase. However, in certain compositions, some precipitates such as ZrC or other carbides or borides may be uniformly distributed.

In accordance with the present invention, the presence of Cr as an alloying addition provides resistance to aqueous corrosion at room temperature and reduces SOFC environmental effects of hydrogen embrittlement which causes decreased room temperature ductility. Hydrogen embrittlement results from the generation of hydrogen from the reaction of Al in the alloy with moisture in the air according to the formula $2Al+3H_2O \rightarrow Al_2O_3+6H$. Other elements such as Mn may be used in addition to or in place of Cr. However, Cr alloying additions are preferred.

The use of a reactive boride-forming or carbide-forming metal such as Zr or Hf results in the formation of carbide or boride precipitates which help with grain refinement. Furthermore, zirconium alloying additions help to increase the oxide scale resistance to spalling under thermal cycling conditions associated with SOFC operations. Without the addition of Zr, the $Al_2O_3$ scale has been found to spall off when the specimen or component is cooled from high SOFC service temperatures to room temperature. Zirconium further improves room temperature ductility, probably through the reduction of the environmental hydrogen embrittlement effect.

Boron enhances grain boundary strength, and combines with reactive elements such as Zr to form zirconium borides and the like.

Carbon combines with reactive elements such as Zr to form zirconium carbides and the like. In addition, carbon enhances weldability.

The present alloys preferably have sufficient Zr or other reactive metal M for substantially all of the available C or B to react therewith to form carbides, e.g., ZrC or borides, e.g., $ZrB_2$. The amount of M is preferably provided in stoichiometric excess of the amount necessary to form the boride and/or carbide precipitates. For example, a ratio of 1:1 for Zr/C indicates a stoichiometric balance where all of the Zr and C are present as ZrC. A ratio of 10:1 means that there is a significant excess of Zr over that needed to form ZrC. The ratios of 20:1 and 40:1 reflect even higher excesses of Zr than needed to form ZrC. While not intending to be bound by any particular theory, it is believed that the alloy properties can be affected by the following possible factors. Extra Zr being present as solid solution may reduce the environmental embrittlement at room temperature through the minimization of hydrogen formation through the reaction $2Al + 3H_2O \rightarrow Al_2O_3 + 6H$. The Zr may also benefit through the combination of damaging atomic hydrogen to lesser damaging molecular hydrogen. The presence of zirconium carbides or borides such as ZrC may also refine the grain size of the present alloys, thereby improving ductility. However, an excess of, for example, ZrC precipitates may actually lower the ductility through poor decohesion strength of ZrC to the matrix.

The preferred Zr to C ratio was determined through conventional melting, processing, and mechanical property testing of eight alloys. The alloy compositions and room-temperature tensile ductility after a 700° C. per hour heat treatment followed by oil quenching are given in Table 2. The tensile data for the eight alloys are given in Tables 3 through 10.

TABLE 2

Iron aluminide alloy compositions containing different zirconium and carbon amounts[a]

Composition

| Alloy No. | Atomic Percent | | | | | | Weight percent | | | | | Room[b] temperature elongation (%) |
|---|---|---|---|---|---|---|---|---|---|---|---|---|
| | Fe | Al | Cr | Zr | C | Zr/C | Fe | Al | Cr | Zr | C | |
| 1 | 65.95 | 28 | 5 | 1 | 0.05 | 20 | 76.89 | 15.77 | 5.43 | 1.90 | 0.01 | 9.46 |
| 2 | 65.90 | 28 | 5 | 1 | 0.10 | 10 | 76.86 | 15.78 | 5.43 | 1.90 | 0.03 | 6.10 |
| 3 | 64.95 | 28 | 5 | 2 | 0.05 | 40 | 75.16 | 15.66 | 5.39 | 3.78 | 0.01 | 1.34 |
| 4 | 64.80 | 28 | 5 | 2 | 0.20 | 10 | 75.09 | 15.68 | 5.39 | 3.79 | 0.05 | 1.70 |
| 5 | 63.00 | 28 | 5 | 2 | 2.00 | 1 | 74.22 | 15.94 | 5.48 | 3.85 | 0.51 | 7.10 |
| 6 | 66.89 | 28 | 5 | 0.1 | 0.01 | 10 | 78.47 | 15.87 | 5.46 | 0.192 | 0.002 | 6.12 |
| 7 | 66.78 | 28 | 5 | 0.2 | 0.02 | 10 | 78.29 | 15.86 | 5.46 | 0.383 | 0.005 | 8.06 |
| 8 | 66.45 | 28 | 5 | 0.5 | 0.05 | 10 | 77.75 | 15.83 | 5.45 | 0.960 | 0.01 | 11.60 |

[a]Elongation at room temperature is also included.
[b]Heat treated at 700° C./1 h followed by oil quenching.

TABLE 3

Fe-28 Al-5 Cr-1 Zr-0.05 C (at. %)

| ALLOY NO. | TEST TEMPERATURE (° C.) | HEAT TREATMENT | YIELD STRENGTH (ksi) | TENSILE STRENGTH (ksi) | TOTAL ELONGATION (%) | REDUCTION OF AREA (%) |
|---|---|---|---|---|---|---|
| 1 | 23 | 700° C./1 h O.Q. | 87.37 | 140.79 | 9.46 | 8.99 |
| 1 | 23 | 750° C./1 h O.Q. | 85.28 | 131.01 | 7.90 | 7.67 |
| 1 | 23 | 800° C./1 h O.Q. | 79.27 | 121.13 | 7.00 | 7.67 |
| 1 | 23 | 850° C./1 h O.Q. | 61.24 | 101.73 | 5.40 | 6.85 |

Strain Rate: 0.2"/min

TABLE 4

Fe-28 Al-5 Cr-1 Zr-0.1 C (at. %)

| ALLOY NO. | TEST TEMPERATURE (° C.) | HEAT TREATMENT | YIELD STRENGTH (ksi) | TENSILE STRENGTH (ksi) | TOTAL ELONGATION (%) | REDUCTION OF AREA (%) |
|---|---|---|---|---|---|---|
| 2 | 23 | 700° C./1 h O.Q. | 85.56 | 123.44 | 6.10 | 6.94 |
| 2 | 23 | 750° C./1 h O.Q. | 80.71 | 123.93 | 7.60 | 8.73 |
| 2 | 23 | 800° C./1 h O.Q. | 76.02 | 115.34 | 6.90 | 7.08 |
| 2 | 23 | 850° C./1 h O.Q. | 56.82 | 94.26 | 5.50 | 7.12 |

Strain Rate: 0.2"/min

TABLE 5

Fe-28 Al-5 Cr-2 Zr-0.05 C (at. %)

| ALLOY NO. | TEST TEMPERATURE (° C.) | HEAT TREATMENT | YIELD STRENGTH (ksi) | TENSILE STRENGTH (ksi) | TOTAL ELONGATION (%) | REDUCTION OF AREA (%) |
|---|---|---|---|---|---|---|
| 3 | 23 | 700° C./1 h O.Q. | 89.99 | 100.92 | 1.34 | 3.19 |
| 3 | 23 | 750° C./1 h O.Q. | 87.39 | 116.76 | 3.26 | 4.04 |
| 3 | 23 | 800° C./1 h O.Q. | 84.05 | 114.65 | 3.58 | 3.76 |
| 3 | 23 | 850° C./1 h O.Q. | 79.23 | 103.25 | 3.06 | 4.82 |

Strain Rate: 0.2" min

TABLE 6

Fe-28 Al-5 Cr-2 Zr-0.2 C (at. %)

| ALLOY NO. | TEST TEMPERATURE (° C.) | HEAT TREATMENT | YIELD STRENGTH (ksi) | TENSILE STRENGTH (ksi) | TOTAL ELONGATION (%) | REDUCTION OF AREA (%) |
|---|---|---|---|---|---|---|
| 4 | 23 | 700° C./1 h O.Q. | 83.20 | 90.87 | 1.70 | 2.89 |
| 4 | 23 | 750° C./1 h O.Q. | 79.42 | 95.58 | 2.20 | 4.24 |
| 4 | 23 | 800° C./1 h O.Q. | 76.86 | 91.82 | 2.86 | 2.84 |
| 4 | 23 | 850° C./1 h O.Q. | — | 31.66 | 1.10 | 2.74 |

Strain Rate: 0.2"/min
*Failed in Pin Hole

TABLE 7

Fe-28 Al-5 Cr-2 Zr-2 C (at. %)

| ALLOY NO. | TEST TEMPERATURE (° C.) | HEAT TREATMENT | YIELD STRENGTH (ksi) | TENSILE STRENGTH (ksi) | TOTAL ELONGATION (%) | REDUCTION OF AREA (%) |
|---|---|---|---|---|---|---|
| 5 | 23 | 700° C./1 h O.Q. | 77.03 | 120.81 | 7.10 | 6.53 |
| 5 | 23 | 750° C./1 h O.Q. | 66.19 | 108.06 | 6.66 | 7.79 |
| 5 | 23 | 800° C./1 h O.Q. | 53.50 | 103.07 | 7.60 | 7.17 |
| 5 | 23 | 850° C./1 h O.Q. | 53.60 | 99.23 | 6.70 | 7.73 |

Strain Rate: 0.2"/min

TABLE 8

Fe-28 Al-5 Cr-0.1 Zr-0.01 C (at. %)

| ALLOY NO. | TEST TEMPERATURE (° C.) | HEAT TREATMENT | YIELD STRENGTH (ksi) | TENSILE STRENGTH (ksi) | TOTAL ELONGATION (%) | REDUCTION OF AREA (%) |
|---|---|---|---|---|---|---|
| 6 | 23 | 700° C./1 h O.Q. | 77.70 | 101.18 | 6.12 | 8.21 |
| 6 | 23 | 750° C./1 h O.Q. | 66.86 | 94.08 | 6.50 | 8.63 |
| 6 | 23 | 800° C./1 h O.Q. | 62.58 | 110.27 | 11.36 | 7.45 |
| 6 | 23 | 850° C./1 h O.Q. | 54.27 | 69.39 | 8.00 | 8.93 |

Strain Rate: 0.2"/min
*Failed in Radius

TABLE 9

Fe-28 Al-5 Cr-0.2 Zr-0.02 C (at. %)

| ALLOY NO. | TEST TEMPERATURE (° C.) | HEAT TREATMENT | YIELD STRENGTH (ksi) | TENSILE STRENGTH (ksi) | TOTAL ELONGATION (%) | REDUCTION OF AREA (%) |
|---|---|---|---|---|---|---|
| 7 | 23 | 700° C./1 h O.Q. | 74.72 | 107.74 | 8.06 | 8.24 |
| 7 | 23 | 750° C./1 h O.Q. | 70.52 | 116.67 | 10.14 | 9.54 |
| 7 | 23 | 800° C./1 h O.Q. | 62.90 | 101.52 | 7.50 | 8.73 |
| 7 | 23 | 850° C./1 h O.Q. | 51.89 | 79.60 | 5.50 | 7.14 |

Strain Rate: 0.2"/min

TABLE 10

Fe-28 Al-5 Cr-0.5 Zr-0.05 C (at. %)

| ALLOY NO. | TEST TEMPERATURE (° C.) | HEAT TREATMENT | YIELD STRENGTH (ksi) | TENSILE STRENGTH (ksi) | TOTAL ELONGATION (%) | REDUCTION OF AREA (%) |
|---|---|---|---|---|---|---|
| 8 | 23 | 700° C./1 h Air Cool | 92.60 | 132.42 | 10.00 | 11.30 |
| 8 | 23 | 700° C./1 h Air Cool | 97.30 | 130.33 | 9.00 | 11.20 |
| 8 | 23 | 700° C./1 h Air Cool | 92.59 | 119.44 | 6.24 | 12.03 |
| 8 | 23 | 700° C./1 h Oil Quench | 93.50 | 143.10 | 12.60 | 14.90 |
| 8 | 23 | 700° C./1 h Oil Quench | 91.40 | 134.54 | 10.60 | 12.50 |
| 8 | 23 | 700° C./1 h Oil Quench | 89.10 | 133.88 | 10.60 | 12.80 |
| 8 | 23 | 750° C./1 h Oil Quench | 77.79 | 121.80 | 9.66 | 12.00 |
| 8 | 23 | 800° C./1 h Oil Quench | 68.77 | 106.95 | 7.56 | 11.37 |
| 8 | 23 | 850° C./1 h Oil Quench | 57.93 | 92.97 | 5.60 | 8.80 |
| 8 | 100 | 700° C./1 h Air Cool | 90.80 | 139.66 | 12.20 | 16.50 |
| 8 | 100 | 700° C./1 h Oil Quench | 85.80 | 147.63 | 16.20 | 15.00 |
| 8 | 400 | 700° C./1 h Air Cool | 92.48 | 135.93 | 25.20 | 33.50 |
| 8 | 400 | 700° C./1 h Oil Quench | 85.40 | 134.89 | 24.00 | 25.00 |
| 8 | 600 | 700° C./1 h Air Cool | 62.70 | 65.80 | 34.40 | 64.70 |
| 8 | 600 | 700° C./1 h Oil Quench | 62.10 | 65.80 | 56.40 | 62.10 |
| 8 | 800 | 700° C./1 h Air Cool | 13.15 | 13.71 | 105.20 | 82.65 |
| 8 | 800 | 700° C./1 h Oil Quench | 11.80 | 11.80 | 139.00 | 83.20 |

Figure 3:
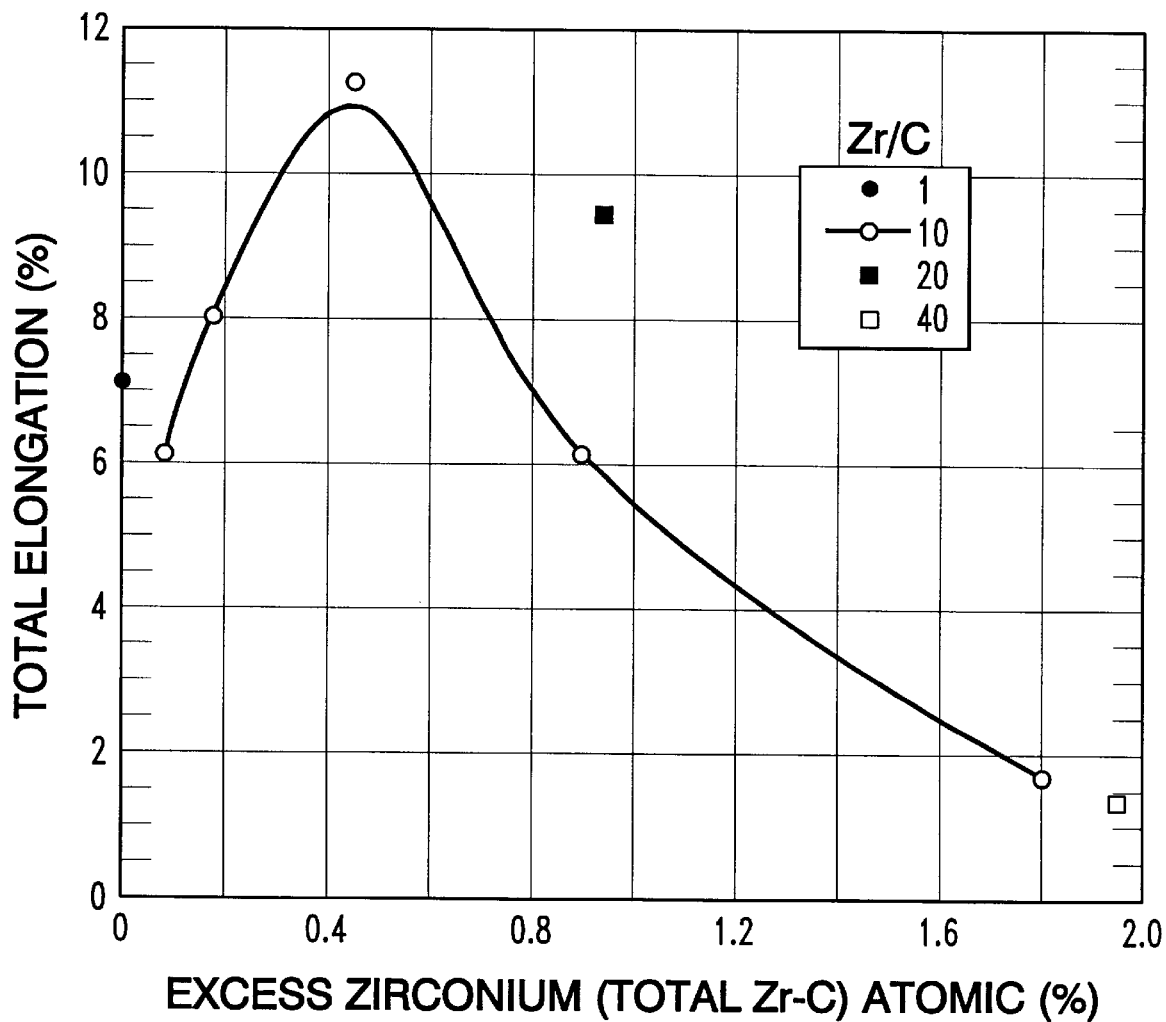
FIG. 3 is a graph showing total elongation for an iron aluminide alloy with varying amounts of Zr and C.

0.5 in. Sheet Specimens
Rolled at 1200° C.
Strain Rate: 0.2"/min
*Strain Rate: 0.0004"/min An important property of the present alloys is room-temperature ductility. Elongation values are plotted as a function of net available Zr (in atomic percent) in FIG. 3. FIG. 3 also identifies the Zr/C ratios of the alloys. For a Zr/C ratio of 10:1, FIG. 3 shows the maximum ductility value of 11.6 percent. Peak ductility is achieved with about 0.5 atomic percent Zr (about 1 weight percent Zr). Thus, FIG. 3 shows that a Zr to C ratio of 10:1 with Zr equal to about 1 weight percent and C equal to 0.01 weight percent gives the highest ductility.

The SOFC container of the present invention may comprise a sheet or plate of the iron aluminide alloy having a typical thickness of from about 1 to about 20 mm, preferably from about 2 to about 10 mm, and more preferably from about 3 to about 6 mm. The entire thickness of the plate preferably comprises the iron aluminide alloy. Alternatively, the iron aluminide alloy may be provided as a surface layer on the interior and/or exterior surface of the SOFC containment vessel. For example, the iron aluminide alloy may be clad to another metal such as low alloy steels or ferritic stainless steel having a similar coefficient of thermal expansion as the iron aluminide alloy.

The iron aluminide alloy plate may be formed by conventional metal working processes or powder metallurgy techniques. The iron aluminide SOFC containment vessel of the present invention may be fabricated by welding component parts of the container together, such as the side, top and bottom sections shown in FIG. 1. Suitable welding techniques include manual gas tungsten arc, and automated gas tungsten arc. For high quality welds a preheat of up to 200° C. and postweld heat treat of 700° C.

In tests using a dual atmosphere with simultaneous exposure to reducing and oxidizing gases at 640° C., superior oxidation behavior (metal loss, oxide adherence, etc.) of the iron aluminide alloy over AISI 304L stainless steel is demonstrated. The present iron aluminide alloys provide the potential for dramatic improvements in lifetimes of SOFC containers.

The improved corrosion resistance of the present iron aluminide SOFC containment alloys may be due to the formation of an alumina-based surface oxide layer that forms on the iron aluminide, compared with the chromia-based surface oxide layer which forms on conventional type 304 stainless steel. The lower growth rate of the aluminum oxide reduces metal loss. In contrast, the formation of chromium oxide and unprotective iron oxide base scale leads to further corrosion and metal loss of stainless steel under SOFC operating conditions. The iron aluminide alloys of the present invention have outstanding corrosion resistance in oxidizing atmospheres, reducing atmospheres and simultaneous oxidizing and reducing gas atmospheres. Upon exposure to oxidizing SOFC environments, the Zr of the present alloys may be concentrated at the base metal/surface oxide interface. It is believed that Zr enrichment at the metal/oxide interface may be responsible for its improved resistance to spallation of the surface oxide under SOFC thermal cycling conditions.

Experiments conducted under simulated SOFC operating conditions compared the performance of type 304 stainless steel and an iron aluminide alloy of the present invention designated FAL having a composition of Fe-15.9Al-5.5Cr-0.15Zr-0.01B, in weight percent. The results shown in Table 11 indicate dramatically superior performance of the iron aluminide alloy. Table 11 provides a comparison of the performance of the alloys under SOFC container conditions after 500 h exposure at 650° C. in flowing air atmospheres on both sides of tubular specimens. The data of Table 11 demonstrate superior performance of the FAL alloy in air, and the dramatically superior performance of the FAL in the SOFC dual gas atmosphere.

TABLE 11

Oxidation Behavior of Iron Aluminide Alloy (FAL) versus Stainless Steel (AISI 304L) Under Dual Atmosphere Conditions

| | |
|---|---|
| Oxidant gas | Air |
| Reducing gas | N-45% $H_2$ (room temperature humidification) |
| Exposure temperature | 650° C. |
| Exposure time | 500 h (five thermal cycles of 100 h duration each) |
| Metal loss on AISI 304L | >40 $\mu$m |
| Metal loss on iron aluminide alloy FAL | <1 $\mu$m |

Whereas particular embodiments of this invention have been described above for purposes of illustration, it will be evident to those skilled in the art that numerous variations of the details of the present invention may be made without departing from the invention as defined in the appended claims.

What is claimed is:

1. A container for a fuel cell comprising an iron aluminide alloy including Fe, from about 13 to about 22 weight percent Al, from about 2 to about 8 weight percent Cr, from about 0.1 to about 4 weight percent M wherein M is at least one metal selected from Zr and Hf, and up to about 1 weight percent of at least one element selected from B and C.

2. The container of claim 1, wherein M is Zr.

3. The container of claim 2, wherein the iron aluminide alloy comprises from about 15 to about 18 weight percent Al, from about 4 to about 6 weight percent Cr, from about 0.1 to about 1.5 weight percent Zr, from about 0.005 to about 0.02 weight percent B or from about 0.002 to about 0.02 weight percent C, and the balance Fe and incidental impurities.

4. The container of claim 3, wherein the iron aluminide alloy comprises from about 15 to about 17 weight percent Al, from about 4.5 to about 5.5 weight percent Cr, from about 0.15 to about 1.0 weight percent Zr, from about 0.007 to about 0.012 weight percent B or from about 0.005 to about 0.012 weight percent C, and the balance Fe and incidental impurities.

5. The container of claim 2, wherein the iron aluminide alloy comprises about 15.9 weight percent Al, about 5.5 weight percent Cr, about 0.15 weight percent Zr, about 0.01 weight percent B, and the balance Fe and incidental impurities.

6. The container of claim 2, wherein the iron aluminide alloy comprises about 15.9 weight percent Al, about 5.5 weight percent Cr, about 0.15 weight percent Zr, about 0.01 weight percent C, and the balance Fe and incidental impurities.

7. The container of claim 1, wherein the iron aluminide alloy is provided in plate form.

8. The container of claim 7, wherein the plate has a thickness of from about 2 to about 10 mm.

9. The container of claim 1, wherein the iron aluminide alloy comprises a surface oxide layer comprising aluminum.

10. The container of claim 1, wherein the iron aluminide alloy is resistant to corrosion when exposed to a temperature of from about 500 to about 800° C.

11. The container of claim 9, wherein the iron aluminide alloy is resistant to corrosion when a surface of the iron aluminide alloy is exposed to a reducing gas and another surface of the iron aluminide alloy is exposed to an oxidizing atmosphere.

12. A method of fabricating a fuel cell container comprising:

providing iron aluminide alloy component parts of a fuel cell container comprising an iron aluminide alloy including Fe, from about 13 to about 22 weight percent Al, from about 2 to about 8 weight percent Cr, from about 0.1 to about 4 weight percent M wherein M is at least one metal selected from Zr and Hf, and from about 0.005 to about 0.5 weight percent B or from about 0.001 to about 1 weight percent C; and joining the iron aluminide alloy component parts together.

13. The method of claim 12, wherein M is Zr.

14. The method of claim 13, wherein the iron aluminide alloy comprises from about 15 to about 18 weight percent Al, from about 4 to about 6 weight percent Cr, from about 0.1 to about 1.5 weight percent Zr, from about 0.005 to about 0.02 weight percent B or from about 0.002 to about 0.02 weight percent C, and the balance Fe and incidental impurities.

15. The method of claim 13, wherein the iron aluminide alloy comprises from about 15 to about 17 weight percent Al, from about 4.5 to about 5.5 weight percent Cr, from about 0.15 to about 1.0 weight percent Zr, from about 0.007 to about 0.012 weight percent B or from about 0.005 to about 0.012 weight percent C, and the balance Fe and incidental impurities.

16. The method of claim 13 wherein, the iron aluminide alloy comprises about 15.9 weight percent Al, about 5.5 weight percent Cr, about 0.15 weight percent Zr, about 0.01 weight percent B, and the balance Fe and incidental impurities.

17. The method of claim 12, wherein the iron aluminide alloy is provided in plate form.

18. The method of claim 17, wherein the plate has a thickness of from about 2 to about 10 mm.

19. The method of claim 12, wherein the iron aluminide alloy component parts are joined by welding.

20. A method of operating a fuel cell generator comprising:

providing a container comprising an iron aluminide alloy;

providing a plurality of fuel cells inside in the container;

providing a reducing atmosphere inside the container in contact with the iron aluminide alloy; and providing an oxidizing atmosphere outside the container in contact with the iron aluminide alloy.

21. The method of claim 20, wherein the iron aluminide alloy comprises from about 13 to about 22 weight percent Al, from about 2 to about 8 weight percent Cr, from about 0.1 to about 4 weight percent M wherein M is at least one metal selected from Zr and Hf, from about 0.005 to about 0.5 weight percent B or from about 0.001 to about 1 weight percent C, and the balance Fe and incidental impurities.

22. The method of claim 21, wherein M is Zr.

23. The method of claim 20, wherein the iron aluminide alloy comprises from about 15 to about 18 weight percent Al, from about 4 to about 6 weight percent Cr, from about 0.1 to about 1.5 weight percent Zr, from about 0.005 to about 0.02 weight percent B or from about 0.002 to about 0.02 weight percent C, and the balance Fe and incidental impurities.

24. The method of claim 20, wherein the iron aluminide alloy comprises from about 15 to about 17 weight percent Al, from about 4.5 to about 5.5 weight percent Cr, from about 0.15 to about 1.0 weight percent Zr, from about 0.007 to about 0.012 weight percent B or from about 0.005 to about 0.012 weight percent C, and the balance Fe and incidental impurities.

25. The method of claim 20, wherein the iron aluminide alloy is provided in plate form.

26. The method of claim 25, wherein the plate has a thickness of from about 2 to about 10 mm.

27. The method of claim 20, wherein the iron aluminide alloy comprises a surface oxide layer comprising aluminum.

28. The method of claim 20, wherein the iron aluminide alloy is exposed to a temperature of from about 500 to about 800° C. during operation of the fuel cell.

29. The method of claim 20, wherein the container is welded.

30. The method of claim 20, wherein the fuel cells comprise solid oxide fuel cells.

* * * * *